(12) United States Patent
Särneö et al.

(10) Patent No.: US 11,549,726 B2
(45) Date of Patent: Jan. 10, 2023

(54) FLEXIBLE SEALING TUBE AND METHOD FOR PRODUCING THE SAME

(71) Applicant: E-TUBE SWEDEN AB, Gothenburg (SE)

(72) Inventors: Peter Särneö, Gothenburg (SE); Lars Westerlind, Gothenburg (SE)

(73) Assignee: E-TUBE SWEDEN AB, Gothenburg (SE)

( * ) Notice: Subject to any disclaimer, the term of this patent is extended or adjusted under 35 U.S.C. 154(b) by 716 days.

(21) Appl. No.: 16/491,333

(22) PCT Filed: Mar. 6, 2018

(86) PCT No.: PCT/EP2018/055434
§ 371 (c)(1),
(2) Date: Sep. 5, 2019

(87) PCT Pub. No.: WO2018/162460
PCT Pub. Date: Sep. 13, 2018

(65) Prior Publication Data
US 2020/0018522 A1    Jan. 16, 2020

(30) Foreign Application Priority Data
Mar. 7, 2017    (SE) .................................... 1750255-0

(51) Int. Cl.
*F24T 10/17*       (2018.01)
*B29C 65/08*       (2006.01)
(Continued)

(52) U.S. Cl.
CPC .............. *F24T 10/17* (2018.05); *B29C 65/08* (2013.01); *B29C 66/1122* (2013.01);
(Continued)

(58) Field of Classification Search
CPC ...... F28D 7/12; F24F 5/00; F24D 3/12; B23P 15/26
(Continued)

(56) References Cited

U.S. PATENT DOCUMENTS 2,329,836 A * 9/1943 Huthsing ................ F16L 11/10
138/119
4,218,607 A * 8/1980 Noland .................. A01K 7/027
138/116
(Continued)

FOREIGN PATENT DOCUMENTS

CH    711385 A2    1/2017
DE    2928414 A1   1/1981
(Continued)

OTHER PUBLICATIONS

International Search Report and Written Opinion dated Jul. 31, 2018 by the International Searching Authority for International Application No. PCT/EP2018/055434, filed on Mar. 6, 2018 and published as WO 2018/162460 on Sep. 13, 2018 (Applicant—E-Tube Sweden AB) (12 Pages).
(Continued)

*Primary Examiner* — Patrick F Brinson
(74) *Attorney, Agent, or Firm* — Ballard Spahr LLP (57) ABSTRACT

A flexible sealing tube is described that is adapted to be installed in and extend along a bore in the ground for use in a system for exchanging of energy with the ground. The flexible sealing tube has a first tube end to be installed at an inner part of said bore, and the flexible sealing tube is closed in the first tube end. The flexible sealing tube also has a first channel and a second channel extending in a longitudinal direction (L) of the flexible sealing tube, the first and second channels being in fluid connection with each other. The first and second channels are formed by the flexible sealing tube.

20 Claims, 6 Drawing Sheets

(51) Int. Cl.
  *B29C 65/00* (2006.01)
  *F16L 11/04* (2006.01)
  *F16L 11/12* (2006.01)
  *F16L 11/22* (2006.01)
  *F28F 21/06* (2006.01)

(52) U.S. Cl.
  CPC .......... *B29C 66/4322* (2013.01); *B29C 66/71* (2013.01); *F16L 11/042* (2013.01); *F16L 11/12* (2013.01); *F16L 11/22* (2013.01); *F28F 21/062* (2013.01); *F28F 2255/02* (2013.01)

(58) Field of Classification Search
  USPC .................. 138/118, 119, 123–126, 115–117
  See application file for complete search history.

(56) References Cited

U.S. PATENT DOCUMENTS

| | | | | |
|---|---|---|---|---|
| 4,228,824 | A | * | 10/1980 | Evans .................... F16L 11/085 138/119 |
| 4,478,661 | A | * | 10/1984 | Lewis ................. B29C 66/4322 138/119 |
| 5,590,715 | A | | 1/1997 | Amerman |
| 6,718,100 | B2 | * | 4/2004 | Morris .................. F16L 11/125 138/116 |
| 8,511,368 | B2 | * | 8/2013 | Hardin .................... F24T 10/17 165/45 |
| 2005/0061472 | A1 | | 3/2005 | Guynn et al. |
| 2011/0036112 | A1 | | 2/2011 | Livingston et al. |
| 2011/0265989 | A1 | | 11/2011 | Alexandersson |
| 2015/0068740 | A1 | | 3/2015 | Broder |

FOREIGN PATENT DOCUMENTS

| | | |
|---|---|---|
| DE | 102008060068 A1 | 2/2010 |
| GB | 2045909 A | 11/1980 |
| GB | 2166862 A | 5/1986 |
| WO | WO-2010/028496 A1 | 3/2010 |
| WO | WO-2017/016790 A1 | 2/2017 |

OTHER PUBLICATIONS

International Preliminary Report on Patentability dated Feb. 7, 2019 by the International Searching Authority for International Application No. PCT/EP2018/055434, filed on Mar. 6, 2018 and published as WO 2018/162460 on Sep. 13, 2018 (Applicant—E-Tube Sweden AB) (14 Pages).

* cited by examiner

FLEXIBLE SEALING TUBE AND METHOD FOR PRODUCING THE SAME

CROSS-REFERENCE TO RELATED APPLICATIONS

This application is a U.S. National Phase Application of International Application No. PCT/EP2018/055434, filed Mar. 6, 2018, which claims priority to Swedish Application No. 1750255-0, filed Mar. 7, 2017, each of which are hereby incorporated by reference in their entirety.

TECHNICAL FIELD

The present disclosure pertains to a flexible sealing tube adapted to be installed in and extend along a bore in the ground for use in a system for exchanging of energy with the ground. Moreover, the present disclosure also relates to a method of producing the flexible sealing tube.

BACKGROUND OF THE INVENTION

Systems for extracting energy from the ground by utilizing a temperature differential between the ground and the environment are known. Current systems typically use a closed rigid tubing system installed in a bore, in which tubing system liquid is pumped to extract energy, such as heating or cooling, from the ground. The liquid is pumped around within the tubing system and, for example, to a heat exchanger in a heat pump.

Energy wells conventionally have depths of between about 100 and 200 meters. The ground water level is often a few meters below ground level and the systems for extracting energy from the ground typically employ heat pumps that take advantage of the substantially constant temperature of the ground at depths greater than approximately 2 meters below ground to source and sink thermal energy necessary to heat and cool the structure, respectively.

There are different layers at different levels in the ground and these layers are of different quality. The layers may constitute of different types of rock, but there may also be layers of sand or gravel of different fraction which may reduce the strength of the walls of the borehole. The borehole may therefore risk bringing unwanted particles into the borehole with the ground water flowing in the ground and particularly in the smaller particle comprising layers or even collapse of the walls of the bore hole.

The amount of energy which may be extracted from the ground depends on several factors, such as the extension of the bore, the temperature of the surrounding ground water and/or the earth crust, the ground water transporting amount around the borehole and the capacity of the installed system for extraction of temperature differences between the surrounding ground and the circulating liquid in the tubing system.

It is therefore an object of the present invention to provide a simplified, convenient system for exchanging energy with a ground with an improved efficiency and a simplified and cost-efficient method for manufacturing such system.

SUMMARY OF THE INVENTION

The above and other objects may be provided by a flexible sealing tube according to claim 1. Further embodiments are set out in the dependent claims, in the following description and in the drawings.

The present disclosure pertains to a flexible sealing tube adapted to be installed in and extend along a bore in the ground for use in a system for exchanging of energy with the ground. The flexible sealing tube comprises a first tube end to be installed at an inner part of the bore. The flexible sealing tube is closed in the first tube end and further comprises a first channel and a second channel extending in a longitudinal direction of the flexible sealing tube. The first and second channels are in fluid connection with each other and the first and second channels are formed by the flexible sealing tube.

The fact that the first and the second channels are formed by the flexible sealing tube and the walls of the channels simultaneously are the walls of the flexible sealing tube provides an effective energy exchange between the ground and the liquid provided in the flexile sealing tube as the liquid is separated from the surrounding ground only by the flexible sealing tube, thus providing an efficient energy transfer between the liquid in the flexible sealing tube and the surrounding ground. Additionally, as the flexible sealing tube filling up the bore also constitutes the channels, the closed system enables a large liquid flow which may deliver a large quantity of heated/cooled liquid.

By "flexible sealing tube" herein is meant a tube formed from a flexible material which material provides a water-impermeable barrier. A flexible material in the meaning of this disclosure is a material which has an inherent capability of folding, preferably to the extent of being doubled, such that material on either side of a fold is capable of lying against the material of the opposite side of the fold. The flexibility is not only utilized for the production of the flexible sealing tube itself, but is also utilised for adaptation to the shape of the walls of the bore in the ground when installed. When the flexible sealing tube is provided with joints, such joints should be water-impermeable as well to maintain the water-impermeable barrier of the flexible sealing tube.

The increase in efficacy of the system may lead to that the depth of the bore can be reduced, resulting in a simplified and more cost efficient solution.

The construction of the flexible sealing tube providing the channel system in the system for exchange of energy with the ground also simplifies the system as the construction requires few components compared to known systems. The flexible sealing may also be conveniently stored and transported as there are no rigid component taking up a lot of space and which may be cumbersome to transport and handle. The flexible sealing tube may be rolled up after manufacturing and conveniently stored and transported in rolled up form.

Optionally, the first and second channel each comprises a first end portion. The first end portions may then be located adjacent to the first tube end, and the first and second channels may be in fluid connection with each other in their first end portions.

As the fluid connection between the first and the second channel is provided within the respective first end portions, the extension of the liquid transport, from the first channel to the second channel, extends from the bore opening to the first end of the flexible sealing tube and thus provides a maximized energy exchange with the ground and a utilization of the entire length of the tube for the liquid flow.

The flexible sealing tube may furthermore comprise a second tube end.

The second tube end may be provided at the level of, or slightly beneath, the bore opening. As the ground water level is often a few meter below ground level the bore may need reinforcement, such as in the form of a steel ring, to compensate for the lack of pressure from the ground water balancing the pressure within the well. The second tube end may be provided beneath the steel ring or overlapping with the steel ring.

Optionally, the first and second channel each comprises a second end portion, the second end portions being located adjacent to the second tube end. The second end portions of the first and second channels may each be adapted to be operatively connected to a heat exchanging device.

Optionally, the second tube end is closed and the first and second channels are operatively connected to the heat exchanging device via a respective first and second inlet/outlet opening provided in the flexible sealing tube. The second tube end may thus, via the first and second inlet/outlet openings, be connected to the heat exchanging device. Each of the inlet/outlet openings may be provided with coupling means allowing connection with tubes for fluidly connecting the flexible sealing tube with the heat exchanging device.

Optionally, at least one of the inlet/outlet openings is provided with a valve. Optionally, both of the inlet/outlet openings are provided with a respective valve.

Optionally, the flexible sealing tube comprises a longitudinally extending first joint, and the first and second channels are provided on opposite sides of the longitudinally extending joint.

Such a flexible sealing tube wherein the first and second channels are formed by a longitudinally extending first joint in the flexible sealing tube, provides for a simple and convenient system which is easy to roll up, store, handle and transport.

Optionally, the walls of the first and second channels of the flexible sealing tube in use are adapted to partially support each other, preferably to lie against each other, and to partially lie against walls of the bore in the ground. In other words, the walls of the first and second channels may consequently be in contact with each other in use of the flexible sealing tube. In the event that the walls of the first and second channels do not lie against each other but still support each other, they may partially lie in close contact and along each other and being separated by e.g. an insulating layer. Such an insulation layer may be used to limit the energy exchange between the first and second channels of the flexible sealing tube.

Such a flexible sealing tube fills up the majority of the cross-section of the bore in the ground, preferably substantially all of the cross-section, for maximising the contact with the ground for efficient energy exchange. The parts of the walls of the first and second channels which lie against each other also support and stabilize the flexible sealing tube when installed Optionally, the longitudinally extending first joint is formed by welding, such as by high frequency welding, gluing or the like.

Optionally, the fluid communication between the first and second channels is formed by an opening provided between the first and second channel.

Optionally, the opening between the first and second channels is located in an area in which the first and second channels are joined together by a second joint and the opening is completely surrounded by the second joint.

Optionally, the flexible sealing tube comprises a thermoplastic material, such as for example polyamide or polyester.

Optionally, the flexible sealing tube comprises a textile material, such as a liquid impermeable textile material. The textile material may be a woven material, such as a woven material made from yarn of thermoplastic fibers. The thermoplastic fibers may be made from synthetic thermoplastic material. The woven material may be coated with a coating material to provide a liquid impermeable material. Such coating may for example be a silicon or polyurethane coating.

The flexible sealing tube may however also comprise or be made of a nonwoven material or a plastic film made from a thermoplastic material. The nonwoven material may be coated with a coating material to provide a liquid impermeable material, such coating may for example be a silicon or polyurethane coating, or a laminate of a plastic film and the nonwoven material.

The objects of the present disclosure may also be achieved by a method of producing a flexible sealing tube according to the appended claims.

As such, the present disclosure relates to a method for manufacturing a flexible sealing tube adapted to be installed in and extend along a bore in the ground for use in a system for exchanging of energy with the ground, comprising the step of;

a) providing a tube-shaped flexible sealing material, the tube-shaped flexible material having a first end and a second end;

b) forming a longitudinally extending first joint thus forming a flexible sealing tube comprising a first and a second longitudinally extending channel separated by the longitudinally extending joint, the first and second longitudinally extending channels each comprising a first end portion and a second end portion, the first channel having a first channel wall and the second channel having a second channel wall, and;

c) fluidly connecting the first and second channels with each other by providing an opening between the channels.

The fact that the first and second channels are formed by a longitudinally extending first joint, provides for a simple and cost efficient method of producing a flexible sealing tube instead of providing separate components Optionally, step c) comprises the steps of;

c1) joining the first and second channel walls with a second joint over a joined area, and;

c2) forming an opening within the joint area such that the opening is completely surrounded by the second joint.

Optionally, the joined area formed by the second joint between the first and second channel walls is formed by welding, such as high frequency welding.

Optionally, step c1) comprises that the joined welded area is formed by inserting welding means, such as electrodes, in the first and second channel and welding together the first and second channel walls to form the joined welded area.

Optionally, in step a) the tube-shaped flexible sealing material is achieved by folding a flexible sealing material to form a tube.

When the tube-shaped flexible sealing material is achieved by folding; step b) of forming a first joint, will simultaneously seal the tube-shaped material while forming the longitudinally extending first joint forming the first and the second longitudinally extending channel.

Optionally, the method further comprises a step d) of joining the first tube end with a third joint.

Optionally, step d) comprises forming the first tube end to provide the first tube end with a tapering shape.

Optionally, the method comprises a step e) of joining the second tube end with a fourth joint. The step e) may be carried out before or after step c) or d).

Optionally, the method comprises a step f) of providing in the second tube end of the flexible sealing tube a first inlet/outlet opening to the first channel and a second inlet/outlet opening to the second channel. Each of the inlet/outlet openings providing fluid connection to the respective channel and may be provided with coupling means allowing connection with tubes for fluidly connecting the flexible sealing tube with the heat exchanging device.

DETAILED DESCRIPTION

It is to be understood that the drawings are schematic and that individual components, such as layers of materials, joints and openings are not necessarily drawn to scale. The flexible sealing tube shown in the figures are provided as examples only and should not be considered limiting to the invention. Accordingly, the scope of invention is determined solely by the scope of the appended claims.

Figure 1A:
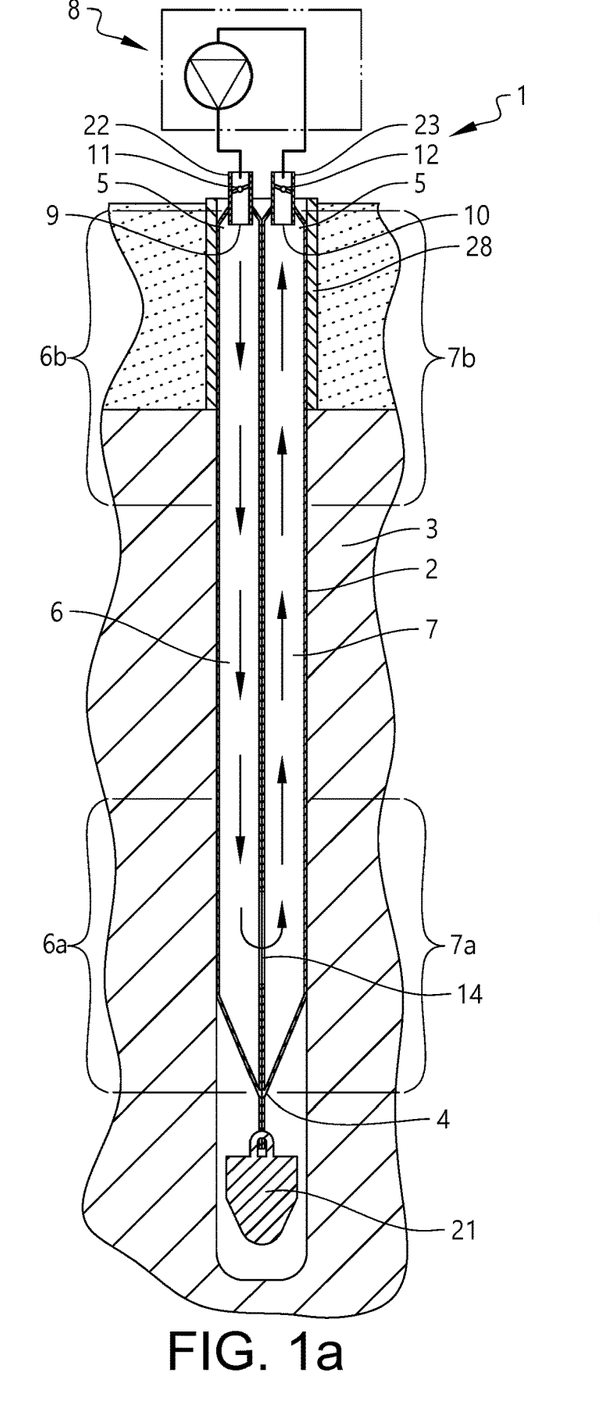
FIG. 1a illustrates a cross-sectional view of a flexible sealing tube according to the present disclosure installed in an energy well.

FIG. 1a illustrates a system for exchanging of energy 1 with the ground 3. The system 1 comprises a flexible sealing tube 2 installed in and extending along a bore in a ground 3. The bore is a generally vertical bore in the ground. The bore is used as energy well for extracting, for example, heat for heating a house (not shown) or for storing heat in the ground 3. Such bores are most often vertical, but may however also be an inclined bore or a horizontally extending bore. At the upper part of the bore 2 the ground 3 is constituted of soil instead of rock. The rock may also penetrate the soil up to the ground surface, but it may also be present hundreds of meters down from the ground surface. Under normal conditions the rock may be found somewhere between a few up to ten to twenty meters underneath the ground level. The flexible sealing tube according to the present disclosure may be used under all of these conditions.

The flexible sealing tube 2, when installed in the bore in the ground 3 and filled with a liquid, will seal against the perimeter of the bore such that the flexible sealing tube 2 seals of different levels along the bore and the risk for contamination between different levels along the bore is reduced.

The flexible sealing tube 2 comprises a closed first tube end 4 installed at the inner part of the bore and a second tube end 5 close to the mouth of the bore at the ground level. Between the ground level and the upper surface of the bore a casing 28, normally a concrete casing, may be installed to shield the bore from the earth layers. The vertical upper end of the casing may be shielded with a casing cover or seal.

The flexible sealing tube 2 furthermore forms a first channel 6 and a second channel 7 extending in a longitudinal direction (L) of the flexible sealing tube 2. The first and second channels 6, 7 are in fluid connection with each other via an opening 14 formed between the first and second channels 6, 7. The first and second channel 6, 7 each comprises a respective first end portion 6a, 7a located adjacent to the first tube end 4. The first and second channels 6, 7 are in fluid connection with each other in their respective first end portions 6a, 7a.

The first and second channel 6, 7 each comprises a respective second end portion 6b, 7b located adjacent to the second tube end 5. The second end 5 is connected to piping's leading into a heat exchanging device 8.

The second end portions 6b, 7b of the first and second channels 6, 7 are each adapted to be operatively connected to a heat exchanging device 8, such as a heat pump system. The first channel 6 is connected to the heat exchanging device 8 via a first inlet/outlet opening 9 and the second channel 7 is connected to the heat exchanging device 8 via a second inlet/outlet opening 10. Each of the inlet/outlet openings 9,10 are provided in the wall of the flexible sealing tube 2. The first and the second inlet/outlet openings 9,10 are provided with a respective valve 11, 12 for controlling the flow and pressure of the liquid in the system for exchanging of energy 1. The first and second inlet/outlet openings 9,10 are connected to the heat exchanging device 8, such as a heat pump, via steel or plastic pipes 22,23.

In order to extract energy from the energy well, the heat pump circulates the liquid in the system 1 and the pipe 22 supplies liquid into the first channel 6. The over pressure produced by the heat pump transports the liquid from the first channel 6 and into the second channel 7, via the opening 14 positioned close to the first tube end 4 of the flexible sealing tube 2. To maximize the energy exchange from the bore, the opening 14 should be positioned as close to the first tube end 4 as possible. The second channel 7 returns the liquid to the heat pump system 8 where the heat energy absorbed by the liquid is extracted and may be transferred to a heating system of a house. The liquid utilized in the system 1 conventionally comprises water and an anti-freezing agent, however it is also possible to use only water or other liquids. The pressure exerted by the liquid in the flexible sealing tube 2 will press the outer walls of the flexible sealing tube 2 against the walls of the bore which effectively closes off water surrounding the flexible sealing tube 2 within the bore from penetrating from one vertical level within the bore to another to another vertical level within the bore.

The system for extracting energy 1 from the ground 3 may also be driven in the reverse direction, such as if the system is to be utilized for storing energy from the ground 3 or to cool the liquid in a cooling system for buildings or other applications.

The flexible sealing tube 2 is preferably made of a thermoplastic textile material, such as for example a woven material made of polyamide or polyester. The material should be substantially water impermeable and sealable, preferable weldable. Other sealing methods may be used if working adequately with the material of the flexible sealing tube 2. The woven material may be made from synthetic thermoplastic fiber yarns, such as for example from polyamide or polyester. The woven material may be coated with a coating material to provide a liquid impermeable material, the coating may be a silicon or polyurethane coating. The material may for example have a weight, including coating, of from 500 $g/m^2$ to 1250 $g/m^2$.

The flexible sealing tube 2 is at its first end 4 sealed with a third joint 18 (shown in FIG. 1b) so that no water from the ground penetrates the flexible sealing tube 2. The third joint 18 is thus a water-impermeable joint. The joints are preferably provided by welding a continuous weld seam. The flexible sealing tube 2 is provided with a hole 20 in the end portion for attachment of a load 21 to facilitate lowering of the flexible sealing tube 2 into the bore in the ground 3. The channels 6 and 7 are, in the second end 5, connected to a top head being the connecting device between the channels 6,7 and piping 22,23.

The length of the flexible sealing tube 2 is adapted to extend substantially all the way up the mouth of the bore at the ground level. One reason why it may be suitable for the flexible sealing tube 2 to extend slightly beneath the level of the mouth of the bore is that it prevents undesirable manipulation or damaging of the flexible sealing tube 2. In such cases, a suitable level of the second tube end 5 may be adjacent to the transition between the frost level and the frost-free level, which in Sweden corresponds to about 1-2 meters below ground level. The part of the bore situated above the second tube end 5, but beneath the mouth of the bore is sealed and may for example be covered with earth. It should be noted that normally all arrangements and fittings for a heat exchange system is concealed underground 3 to prohibit manipulation or weather impacts.

The flexible sealing tube 2 may typically have a length of 100-200 meters, to extend substantially all the way down to the bottom of the bore. The length of the flexible sealing tube 2 may be adjusted to fit the intended bore, the flexible sealing tube 2 may thus be both shorter and longer depending on the requirements of the specific energy well. The diameter of the flexible sealing tube may be from 10 to 25 cm, which should correspond to the diameter of the bore in which the flexible sealing should be installed.

Figure 1B:
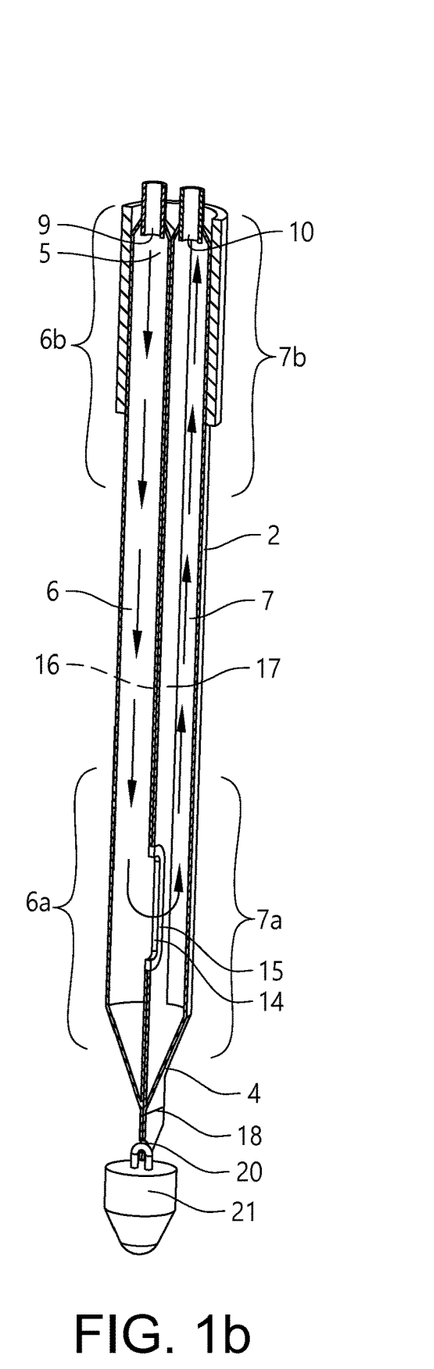
FIG. 1b illustrates a cross-sectional view of the flexible sealing tube shown in FIG. 1a FIG. 2 illustrates a perspective view of the first end portions of the first and second channels of a flexible sealing tube according to the present disclosure.
Figure 2:
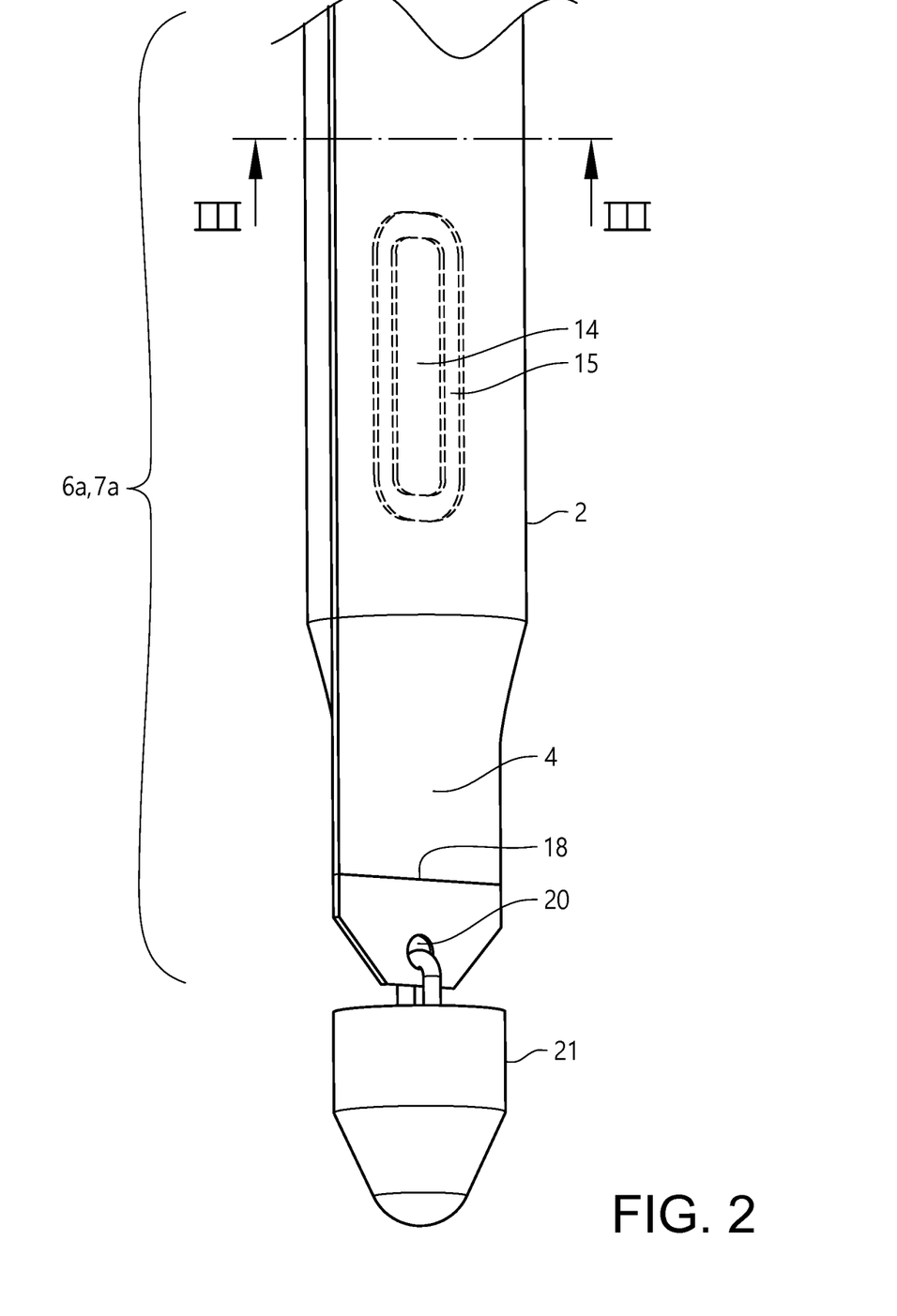

FIG. 1b is a cross-sectional view of the flexible sealing tube 2 shown in FIG. 1a. The fluid connection between the first and the second channels 6, 7 is provided by the openings in the first and second channel walls 16,17 which are folded against each other such that the openings located in each of the first and second channel walls 16,17 forms the fluidly connecting opening 14. The first and second channel walls 16,17 are joined with a second joint 15 over a joined area and the opening 14 is punched out within the joined area in each of the first and second channel wall 16,17 such that the opening 14 is completely surrounded by the second joint 15. This is also illustrated in FIG. 2, which is a perspective view of the flexible sealing tube 2 in the first end portion part. The joint 15 is a water-impermeable joint forming a water-impermeable seal around the opening 14.

Figure 3:
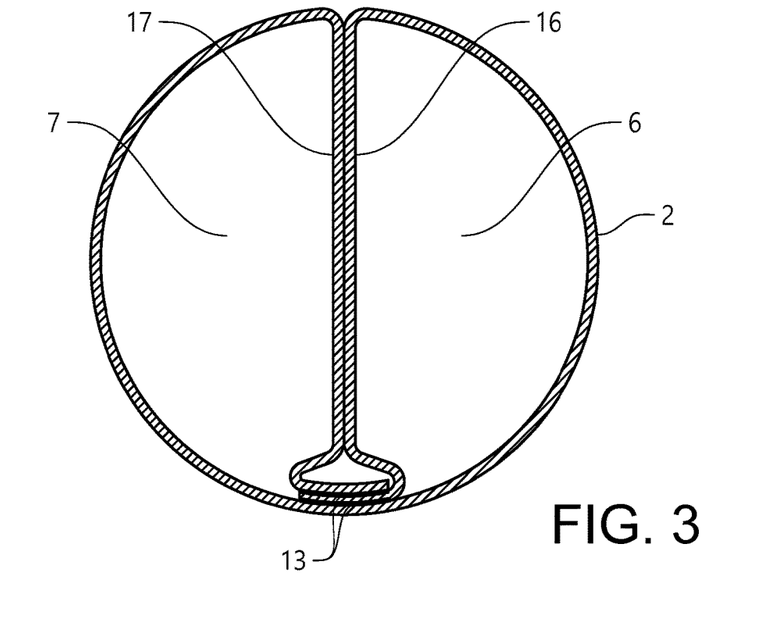
FIG. 3 illustrates a cross-sectional view of the flexible sealing tube according to the present disclosure.

FIG. 3 is a cross-sectional view taken along lines III-III in FIG. 2 and illustrates the flexible sealing tube 2 with a longitudinally extending first joint 13 and the first and second channels 6, 7 provided on opposite sides of the longitudinally extending first joint 13. As may be seen in FIG. 3, the flexible sealing tube 2 is folded over the longitudinally extending first joint 13 with the first and the second channel walls 16, 17 in contact with each other. The longitudinally extending first joint 13 may formed by sealing through for instance gluing or welding, for instance with high frequency weld to form a continuous joint.

The joints provided to the flexible sealing tube 2 is preferable performed by means of the same sealing method, preferably by the same welding method. The width of each of the joints is preferably within the range of from 10 to 75 mm. The width of the joints 13 and/or 15 may be around from 15 to 35 mm, however the width may from around from around 45 to 75 mm to strengthen critical parts.

According to the above disclosure the flexible sealing tube 2 may consequently be described in general terms as being adapted to be installed in and extend along a bore in a ground 3 for use in a system for exchanging of energy 1 with the ground 3. The flexible sealing tube 2 comprises a first tube end 4 to be installed at an inner part of the bore. The flexible sealing tube 2 is closed in the first tube end 4, and comprises further a first channel 6 and a second channel 7 extending in a longitudinal direction L of the flexible sealing tube 2. The first and second channels 6, 7 are in fluid connection with each other, and are formed by the flexible sealing tube 2.

Figure 4:
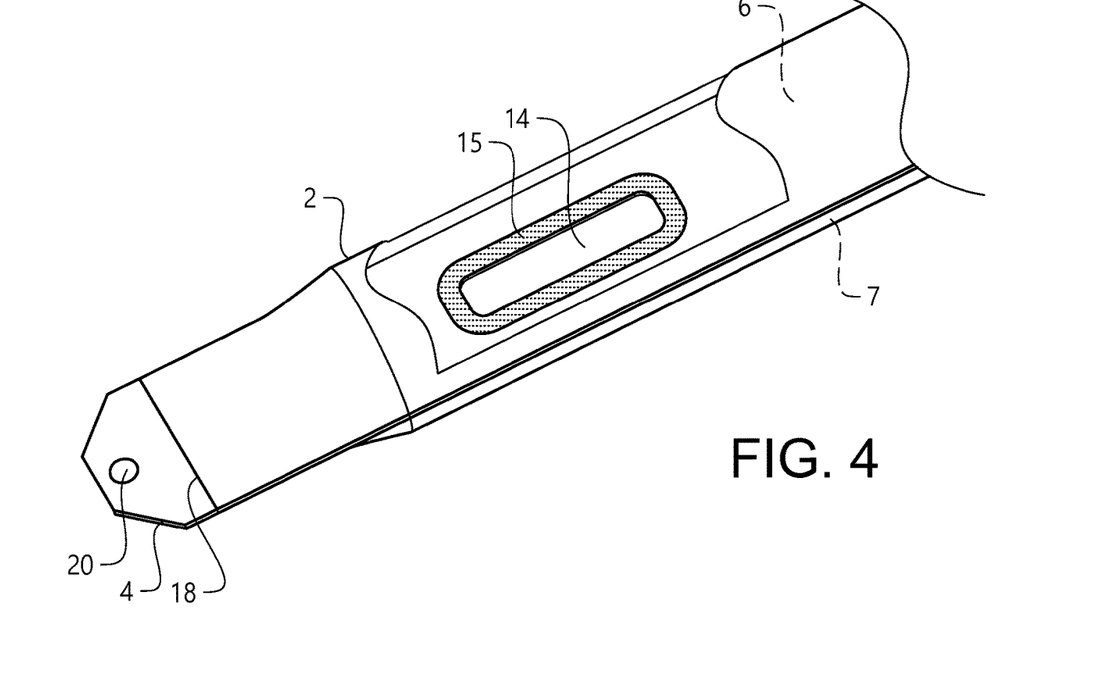
FIG. 4 illustrates a cutaway view of the flexible sealing tube according to the present disclosure.

FIG. 4 is a cutaway view of the first end portion 6a of the flexible sealing tube 2, showing the first channel 6 and the opening 14 located between the first and second channel walls 16,17 and the joint 15 surrounding the opening 14. The width of the joint 15 is between 15 and 55 mm.

Figure 5A:
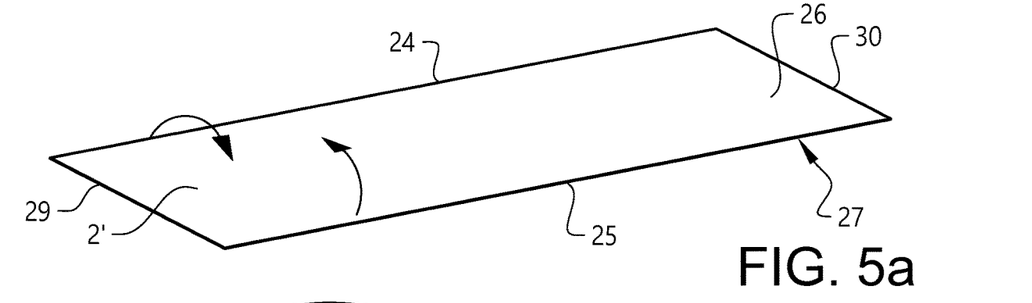
FIG. 5a-k shows schematically a process for producing the flexible sealing tube in FIGS. 1-4.
Figure 5B:
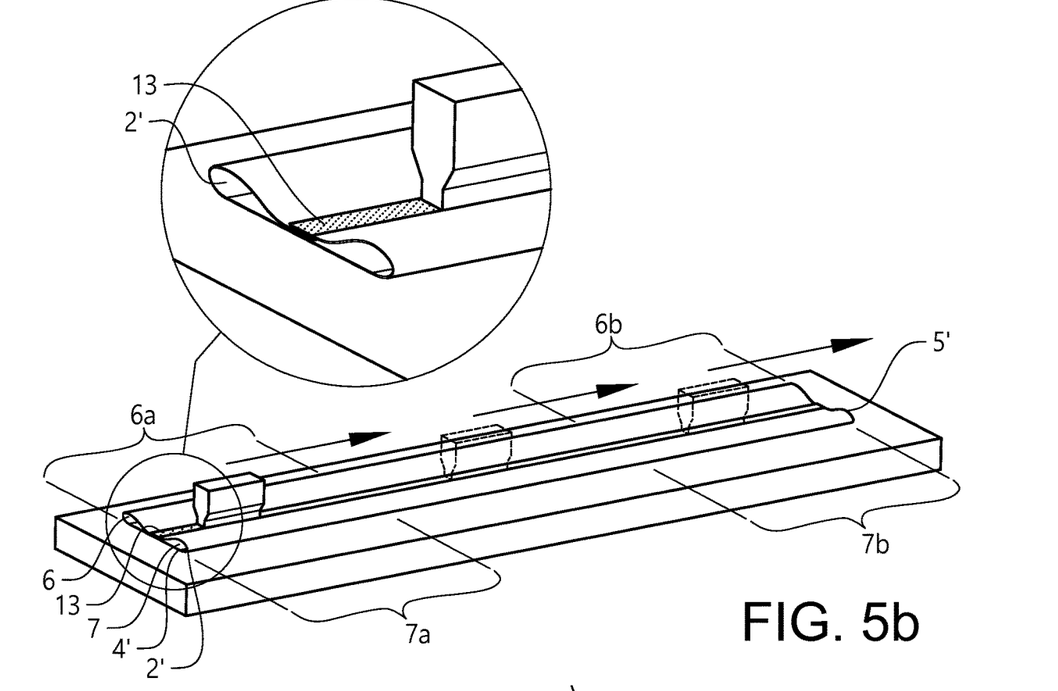

A flexible sealing tube 2 as shown in FIG. 1-4 may be produced by the method illustrated in FIGS. 5a-k. The method involves folding a flexible sealing material 2' shown in FIG. 5a into a tube-shaped flexible sealing material 2' having a first end 4' and a second end 5' as shown in FIG. 5b. The flexible sealing material has a first side 26 and a second side 27, longitudinally opposing first and second side edges 24, 25 and transverse opposing side edges 29, 30. The opposing longitudinal side edges 24, 25 of the flexible sealing material 2' are folded over the first side 26 of the flexible sealing material 2' such that they overlap each other and that a tube-shaped flexible sealing material 2' having a longitudinal direction L is formed. The longitudinal side edges 24, 25 may also extend side by side in a abutting relationship when the flexible sealing material 2' has been folded. A longitudinally extending first joint 13 is then formed, as illustrated in FIG. 5b, between the first and the second transverse side edges 29, 30, sealing the longitudinal side edges 24, 25 of the tube-shaped flexible sealing material 2' to the first side 26 of the flexible sealing material 2' such that a flexible sealing tube 2 is provided comprising a first and a second longitudinally extending channel 6, 7 separated by the longitudinally extending first joint 13. The first and second longitudinally extending channels 6, 7 each comprise a first end portion 6a, 7a and a second end portion 6b, 7b. Alternatively, the flexible sealing tube 2 may be provided in pre-sealed or in ready-made tube-shaped form prior to the step illustrated in FIG. 5b of providing a longitudinally extending first joint 13 extending from the first transverse side edge 29 to the second transverse side edge 30.

It is also conceivable that more than one longitudinally extending joint are formed such that more than two longitudinally extending channels are formed in the flexible sealing tube 2.

It is also conceivable that the opposing longitudinal side edges 24, 25 of the flexible sealing material 2' are folded over the first side 26 of the flexible sealing material 2' such that they do not overlap each other and that they do not end up in abutment with each other, but that they are positioned in opposing relationship at a distance from each other such that a tube-shaped flexible sealing material 2' having a longitudinal direction L is thus formed. The step illustrated in FIG. 5b may then take place either in a single step or in in substeps, either in parallel or in consecutive order. Each opposing longitudinal side edges 24, 25 may be sealed by a common seal, or by each one their own seal. In the latter case the longitudinally extending first joint 13 is made up by two combined seals.

Figure 5C:
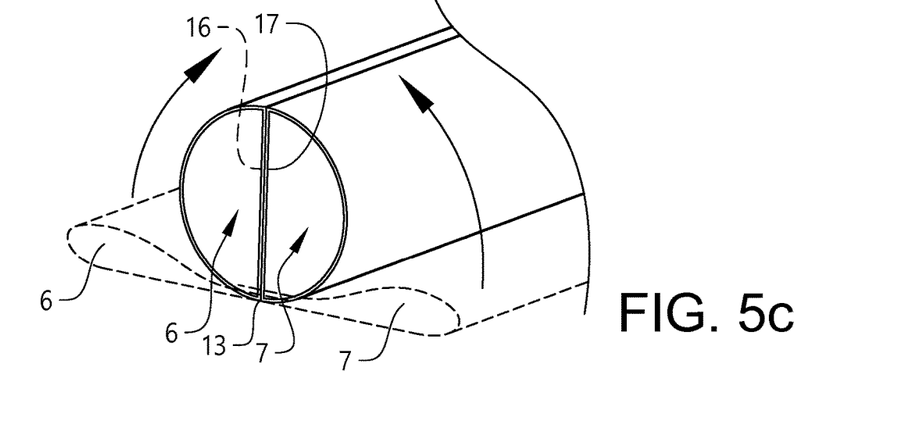

FIG. 5c illustrates folding of the flexible sealing tube 2 over the longitudinally extending first joint 13 such that the flexible sealing tube 2 is in a double folded configuration. The first channel 6 has a first channel wall 16 and the second channel 7 has a second channel wall 17 as shown in FIG. 5c. The flexible sealing tube 2 may of course be folded differently, such that for example the longitudinally extending first joint 13 is located centrically in the flexible sealing tube 2.

Figure 5D:
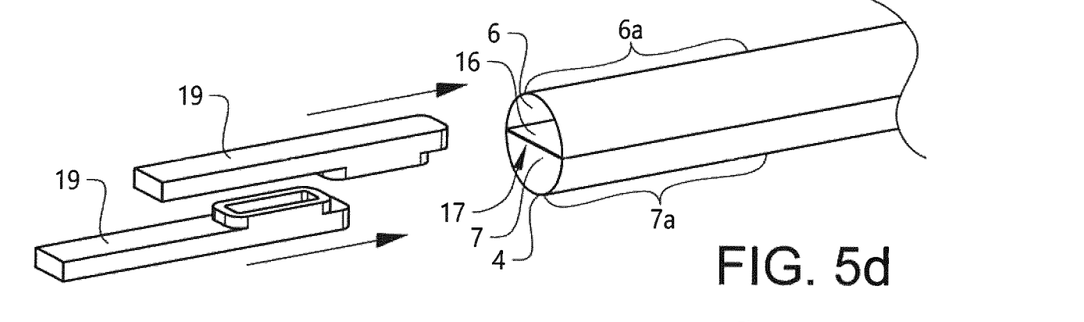
Figure 5E:
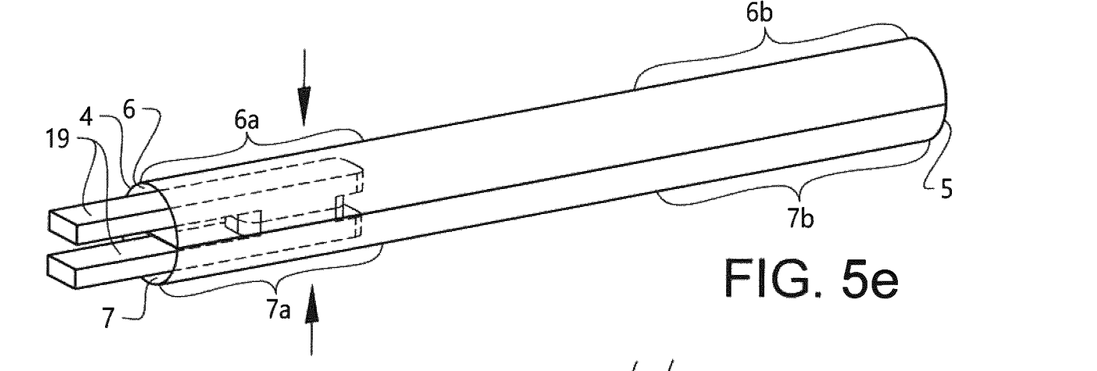
Figure 5F:
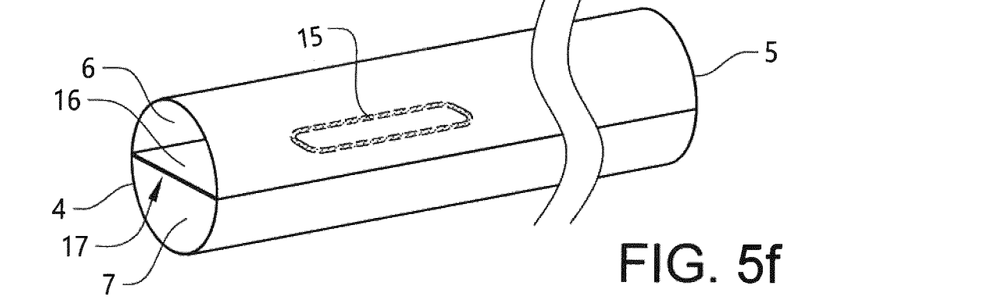
Figure 5G:
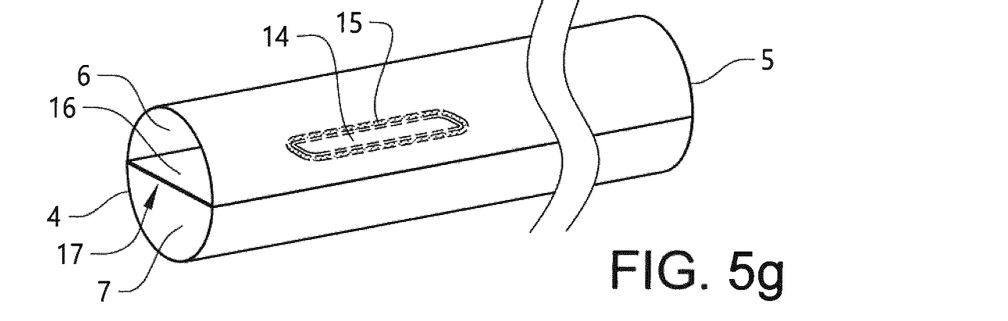

FIG. 5d illustrates introducing welding means 19, such as electrodes, in the first and second channel 6, 7 in a first tube end 4 and FIG. 5e illustrates pressing together of the welding means 19 against the first and second channels walls 16,17 and welding together the first and second channel walls 16, 17 with a second joint 15 to form a joined welded area as illustrated in FIG. 5f. An opening 14 is subsequently punched out in the first and the second channel walls 16,17 and within the joined welded area such that the first and the second channels 6,7 are fluidly connected. As illustrated in FIG. 5g, the opening 14 is completely surrounded by the second joint 15. The opening 14 may optionally be differently designed and may be located closer or further away from the first tube end 4. The opening 14 may have a width corresponding to from 35 to 99% of the diameter of the flexible sealing tube. The opening will be designed to give a minimum passage resistance to the liquid, but still as close as possible to the first end 4.

Figure 5H:
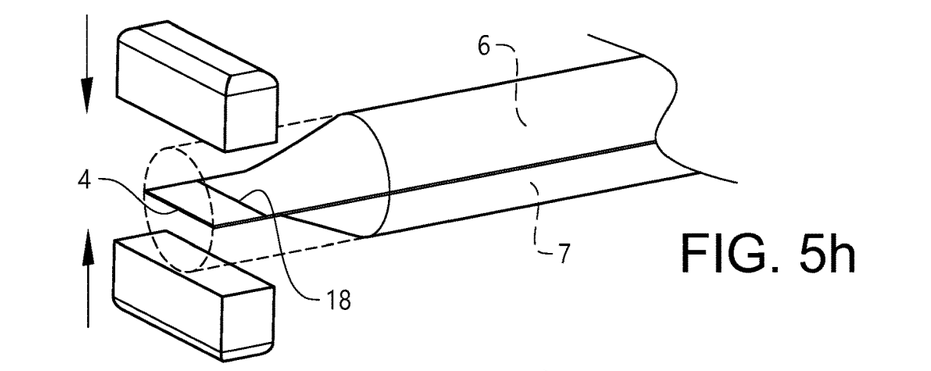

FIG. 5h illustrates closing the flexible sealing tube 2 in the first tube end 4 and sealing the first end 4 with a third joint 18 thus forming the flexible sealing tube 2 with a closed first end 4. The third joint 18 may be a continuous joint formed by adhesive or welding, such as high frequency welding. The third joint 18 may have a different design than the one illustrated in FIG. 5h, such as for example a v-shaped joint or the first tube end 4 may be folded prior to joining the first tube end 4. The second tube end (not shown) may similarly to the first tube end 4 be provided with a fourth welding joint sealing the second tube end.

The welding may be carried out by other welding methods than high frequency welding, such as for example heat sealing, ultrasonic welding or hot plate welding. The welding may also be replaced by other methods for providing a joint, such as gluing using a glue, taping using a tape, or similar methods. It is also conceivable to combine two or more methods.

Figure 5I:
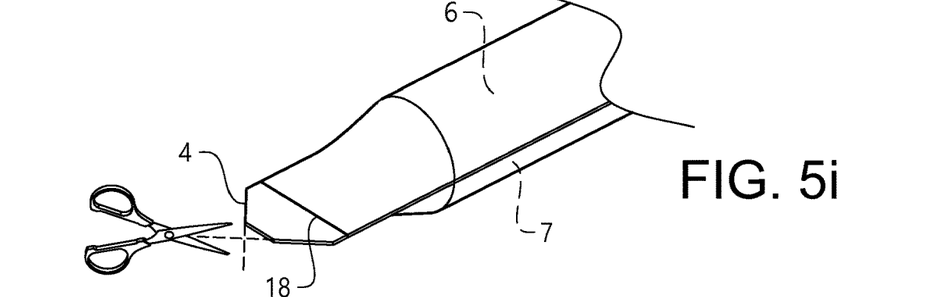

FIG. 5i illustrates the optional step of providing of the first tube end 4 with a tapering shape, the tapering shape may for example be triangular shape or a truncated triangle.

Figure 5J:
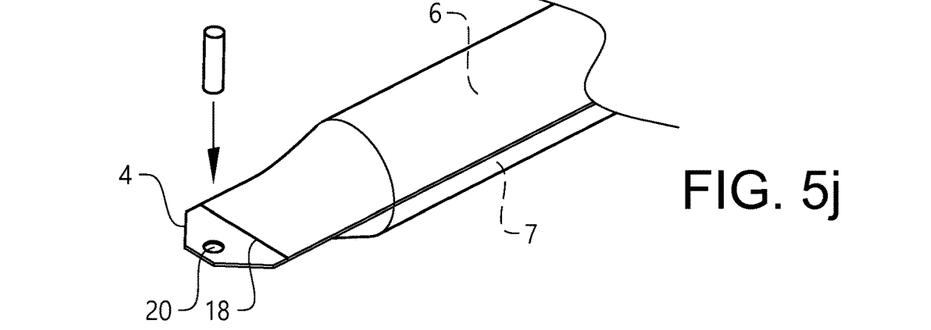

FIG. 5j illustrates the optional step of providing the first tube end 4 with a hole 20, facilitating the attachment of a load (not shown) when introducing the flexible sealing tube into a bore in the ground.

Figure 5K:
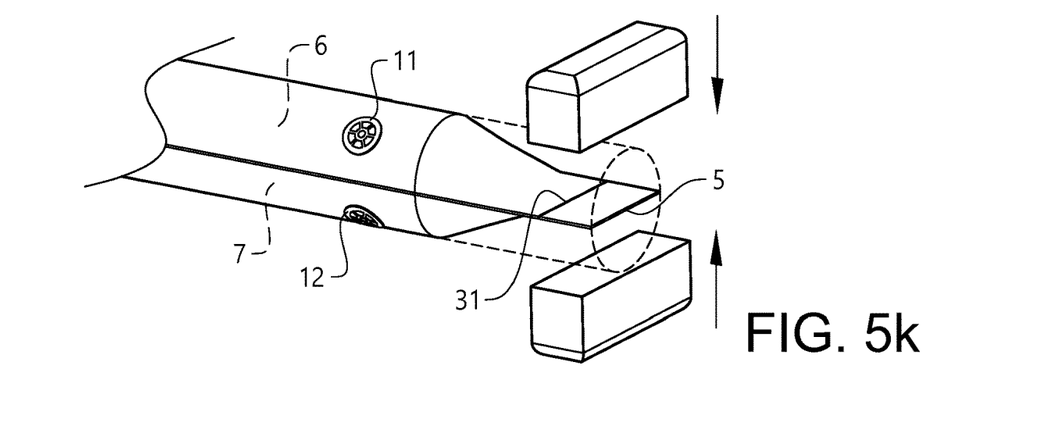

FIG. 5k illustrates the optional step of providing the walls of the first and the second channels 6,7 with valve means 11, 12 and subsequently sealing the second tube end 5 by means of welding with a fourth joint 31.

After manufacturing of the flexible sealing tube 2, the air present inside the flexible sealing tube 2 may be pressed out through the valve means 11, 12 such that the flexible sealing tube 2 may be wound up into a roll. The fact that the flexible sealing tube 2 mainly comprises flexible parts thus enables easy and convenient transport and storage of the flexible sealing tube 2. The flexible sealing tube 2 may, during installation in the bore, be connected to pipes, such as steel or plastic pipes, as illustrated in FIGS. 1a and b, to enable circulation of liquid and extraction of energy from the ground.

The invention claimed is:

1. A flexible sealing tube adapted to be installed in and extend along a bore in a ground for use in a system for exchanging of energy with the ground, said flexible sealing tube comprising a first tube end to be installed at an inner part of said bore, said flexible sealing tube being closed in said first tube end, said flexible sealing tube further comprising a first channel and a second channel extending in a longitudinal direction (L) of said flexible sealing tube, said first and second channels being in fluid connection with each other, wherein said flexible sealing tube comprises a longitudinally extending first joint, said first and second channels being provided on opposite sides of said longitudinally extending first joint, and said flexible sealing tube being folded over the longitudinally extending first joint such that first and second channel walls are in contact with each other.

2. The flexible sealing tube according to claim 1, wherein said first and second channels each comprises a first end portion, said first end portions being located adjacent to said first tube end, and wherein said first and second channels are in fluid connection with each other in said first end portions.

3. The flexible sealing tube according to claim 1, wherein said flexible sealing tube comprises a second tube end.

4. The flexible sealing tube according to claim 3, wherein said first and second channels each comprises a second end portion, said second end portions being located adjacent to said second tube end and said second end portions of said first and second channels are each adapted to be operatively connected to a heat exchanging device.

5. The flexible sealing tube according to claim 4, wherein said second tube end is closed and said first and second channels are operatively connected to said heat exchanging device via a respective first and second inlet/outlet opening provided in said flexible sealing tube.

6. The flexible sealing tube according to claim 5, wherein at least one of said inlet/outlet openings is provided with a valve means.

7. The flexible sealing tube according to claim 1, wherein said longitudinally extending first joint is formed by a welding, gluing or the like.

8. The flexible sealing tube according to claim 1, wherein said fluid communication between said first and second channels is formed by an opening between said first and second channel.

9. The flexible sealing tube according to claim 8, wherein said opening between said first and second channel is located in an area in which said first and second channels are joined together by a second joint and said opening is completely surrounded by said second joint.

10. The flexible sealing tube according to claim 1, wherein said flexible sealing tube comprises a thermoplastic material.

11. The flexible sealing tube according to claim 1, wherein said flexible sealing tube comprises a textile material.

12. A method for manufacturing a flexible sealing tube adapted to be installed in and extend along a bore in the ground for use in a system for exchanging of energy with the ground, comprising the steps of:
  a) providing a tube-shaped flexible sealing material, said tube-shaped flexible material having a first end and a second end;
  b) forming a longitudinally extending first joint thus forming a flexible sealing tube comprising a first and a second longitudinally extending channel separated by said longitudinally extending first joint, said first and second longitudinally extending channels each comprising a first end portion and a second end portion, said first channel having a first channel wall and said second channel having a second channel wall, and;
  c) fluidly connecting said first and second channels by providing an opening between said channels,
  wherein in step a) said tube-shaped flexible sealing material is achieved by folding a flexible sealing material to form a tube.

13. The method according to claim 12, wherein step c) comprises the steps of:
  c1) joining said first and second channel walls with a second joint over a joined area, and;
  c2) forming an opening within said joint area such that said opening is completely surrounded by said second joint.

14. The method according to claim 13, wherein said joined area formed by said second joint between said first and second channel walls is formed by welding.

15. The method according to claim 14, wherein step c1), said joined welded area is formed by inserting welding means in said first and second channel and welding together said first and second channel walls to form said joined welded area.

16. The method according to claim 12, wherein said method further comprises a step d) of joining said first tube end with a third joint.

17. The method according to claim 16, wherein step d) comprises forming said first tube end to provide said first tube end with a tapering shape.

18. A flexible sealing tube adapted to be installed in and extend along a bore in a ground for use in a system for exchanging of energy with the ground, wherein said flexible sealing tube is manufactured according to claim 12.

19. A flexible sealing tube according to claim 18, wherein said flexible sealing tube comprising a first tube end to be installed at an inner part of said bore, said flexible sealing tube being closed in said first tube end, said flexible sealing tube further comprising a first channel and a second channel extending in a longitudinal direction (L) of said flexible sealing tube, said first and second channels being in fluid connection with each other, wherein said flexible sealing tube comprises a longitudinally extending first joint, said first and second channels being provided on opposite sides of said longitudinally extending first joint, and said flexible sealing tube being folded over the longitudinally extending first joint such that first and second channel walls are in contact with each other.

20. A system for exchanging of energy with the ground comprising said flexible sealing tube according to claim 1, wherein said flexible sealing tube is installed in and extending along a bore in the ground.

* * * * *